United States Patent
Billerbeck

(10) Patent No.: US 7,193,649 B2
(45) Date of Patent: Mar. 20, 2007

(54) IMAGE PROCESSING DEVICE SUPPORTING VARIABLE DATA TECHNOLOGIES

(75) Inventor: Bryed Billerbeck, Mountain View, CA (US)

(73) Assignee: Logitech Europe S.A., Romanel-sur Morges (CH)

( * ) Notice: Subject to any disclaimer, the term of this patent is extended or adjusted under 35 U.S.C. 154(b) by 730 days.

(21) Appl. No.: 10/405,575

(22) Filed: Apr. 1, 2003

(65) Prior Publication Data

US 2004/0196374 A1 Oct. 7, 2004

(51) Int. Cl.
*H04N 5/76* (2006.01)
*H04N 5/225* (2006.01)

(52) U.S. Cl. .................. 348/231.6; 348/207.1
(58) Field of Classification Search .......... 348/207.99, 348/207.1, 207.2, 231.3, 231.6
See application file for complete search history.

(56) References Cited

U.S. PATENT DOCUMENTS 5,016,107 A * 5/1991 Sasson et al. ............ 348/231.1
5,926,208 A * 7/1999 Noonen et al. .......... 348/14.13
6,362,851 B1   3/2002 Lavelle et al.
2001/0033343 A1* 10/2001 Yap et al. .................... 348/734
2002/0054212 A1* 5/2002 Fukuoka ..................... 348/207

* cited by examiner

*Primary Examiner*—Ngoc-Yen Vu
*Assistant Examiner*—Nicholas G Giles
(74) *Attorney, Agent, or Firm*—Townsend and Townsend and Crew, LLP

(57) ABSTRACT

A method for processing image data using a digital camera includes providing a digital camera having a first transformation program as a default program, the first transformation program supporting a first transformation technology. A first communication link is formed between the digital camera and a first remote image processing device. Transformation-related information is obtained from the first remote device, the transformation-related information including information about one or more transformation technologies supported by the first remote device. Whether the first transformation program is supported by the first remote device is determined. A second transformation program supported by the first remote device is searched if the first transformation program is determined not to be supported by the first remote device, the second transformation program supporting a second transformation technology.

18 Claims, 6 Drawing Sheets

IMAGE PROCESSING DEVICE SUPPORTING VARIABLE DATA TECHNOLOGIES

BACKGROUND OF THE INVENTION

The present invention relates to a method and apparatus for processing image data.

Digital cameras, including digital still cameras and digital video cameras, have been gaining wide acceptance among consumers recently. The digital still cameras ("DSC") are configured to capture and store primarily still pictures or images, whereas the digital video cameras ("DVC"), e.g., camcorders, are configured to capture and store primarily moving pictures or videos. Many DSCs, however, are also configured to take videos as well as still pictures. Similarly, many DVCs also are configured to take still pictures as well as videos. Generally, the DSCs and DVCs are provided with audio recording features as well.

The digital camera is generally connected or linked to a host device to view., transfer, or edit the images captured using the camera. DSC is generally coupled to a computer for such a purpose, and DVC is generally coupled to a television system or computer for such a purpose. One example of a digital camera is disclosed in U.S. Pat. No. 6,362,851, which is assigned to the assignee of the present application, which is incorporated herein by reference.

The world is being proliferated with various consumer electronic devices, such as, personal digital assistants ("PDAs"), mobile phones, scanners, printers, digital televisions, video conference phones, and the like, that are provided with image processing capabilities. These electronic devices are generally designed for specific applications so they are configured to support only specific compression or data formats and provided with proprietary user interfaces. Even the same type of electronic devices support different data compression standards and user interfaces according to the manufacturers of the devices.

Similarly, the digital cameras are provided with their own specific data compression technologies and user interfaces. For example, the DVC commonly uses a digital video ("DV") format or a Motion Picture Experts Group ("MPEG") standard set by the International Organization for Standardization/International Electrotechnical Commission (ISO/IEC). Other video compression technologies are the H.261, H.262, and H.263 standards of the International Telecommunications Union, Microsoft WMV, Teleconferencing Section (ITU-T), which are generally used for video conferencing. The DSC commonly uses a Joint Photographic Experts Group (JPEG) standard set by the ISO/ITU for storing images in compressed form using a discrete cosine transform and entropy coding. Alternatively, the digital cameras may be provided with proprietary compression technologies. Accordingly, the digital cameras of today are configured to display captured images with selected types of consumer electronic devices but are not compatible with many other electronic devices.

BRIEF SUMMARY OF THE INVENTION

In one embodiment, a method for processing image data using a digital camera includes providing a digital camera having a first transformation program as a default program, the first transformation program supporting a first transformation technology. A first communication link is formed between the digital camera and a first remote image processing device. Transformation-related information is obtained from the first remote device, the transformation-related information including information about one or more transformation technologies supported by the first remote device. Whether the first transformation program is supported by the first remote device is determined. A second transformation program supported by the first remote device is searched if the first transformation program is determined not to be supported by the first remote device, the second transformation program supporting a second transformation technology.

In another embodiment relates to a method for processing image data using a digital camera, the digital camera having a first compression program as a default compression program. The method includes forming a first communication link between the digital camera and a first remote image processing device; obtaining transformation-related information from the first remote device, the transformation-related information including information about one or more transformation technologies supported by the first remote device; determining whether the default compression program is supported by the first remote device; and searching in a non-volatile memory of the digital camera for another compression program if the default compression program is determined not to be supported by the first remote device.

In another embodiment, a method for processing image data using a digital camera includes forming a communication link between the digital camera and a remote image processing device; obtaining transformation-related information from the remote device, the transformation-related information including information about one or more compression technologies supported by the remote device; and searching in a non-volatile memory of the digital camera for a compression program that is supported by the remote device, the non-volatile memory storing a plurality of compression programs.

In yet another embodiment, an image processing device includes a lens; an image sensor to receive light from the lens; a first storage area to store image data derived from the light received by the image sensor; a second storage area to store a plurality of encoding programs suitable for encoding image data; a communication interface configured to provide an interface with a remote image processing device; a programmable processor configured to select a first encoding program from the plurality of encoding programs stored in the second storage area and transform the image data stored in the first storage area according to the selected encoding program; and a housing enclosing at least the image sensor, first storage area, second storage area, and the processor.

For a further understanding of the nature and advantages of the invention, reference should be made to the following description taken in conjunction with the accompanying drawings.

DESCRIPTION OF THE SPECIFIC EMBODIMENTS

Figure 1:
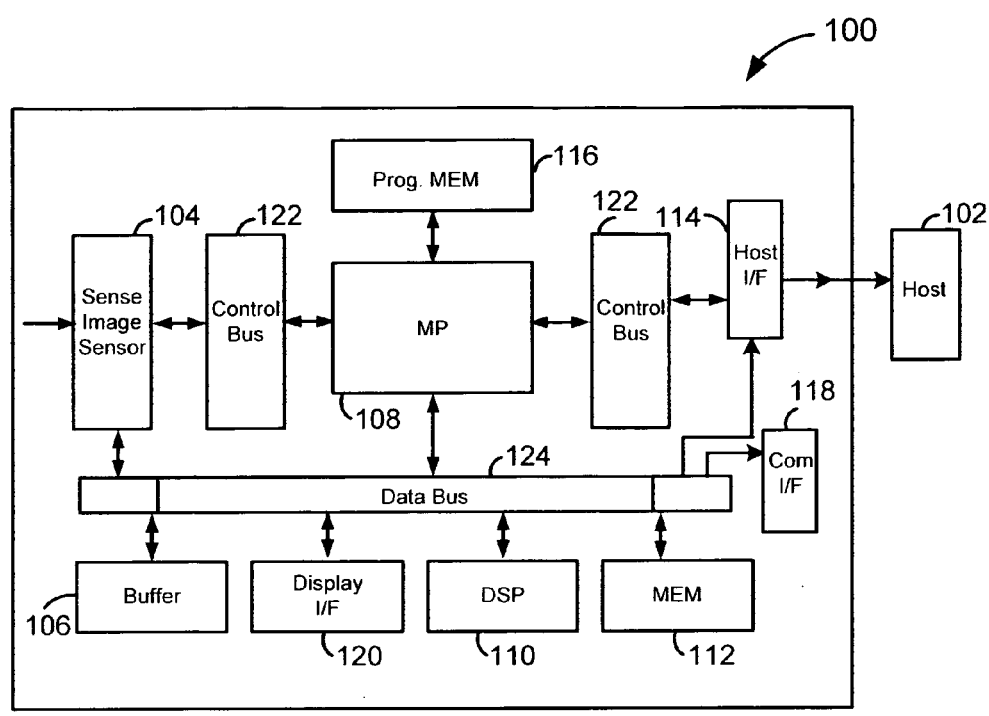
FIG. 1 is a block diagram of a digital camera according to one embodiment of the invention.

FIG. 1 depicts a digital camera 100 coupled to a host device 102 according to one embodiment of the present invention. As used herein, the term "digital camera" refers to an electronic device that captures still or moving images and converts or facilitates in converting the captured images into digital image data. The digital camera includes a digital still camera that is configured to capture primarily still images and a digital video camera, e.g., camcorder, which is configured to capture primarily moving pictures. The host device 102 may be various different electronic devices, e.g., a desktop computer, laptop computer, television, optical disk apparatus, video tape player, PDA, mobile phone, scanner, printer, set top box, and other devices that are configured to process image data.

The digital camera 100 includes an image sensor 104 that receives reflected light of an object and converts it to image signals, a buffer 106 that receives the image signals from the image sensor, a microprocessor or processing system 108 that processes the image signals which includes converting the image signals to digital data, a digital signal processor (DSP) 110 that encodes or compresses the digital data to more manageable data size, a memory or storage area 112 that stores encoded data, and a host interface 114 that serves as a communication interface between the digital camera and the host device.

The digital camera 100 also includes a program memory 116, e.g., non-volatile memory, that stores various "transformation programs." In one embodiment, the program memory is a read only memory (ROM). As used herein, the term "transformation program" refers to an encoding, decoding, decompressing, or transcoding program, or a combination thereof. For example, the transformation program includes recognized standards (e.g., JPEG, MPEG 1, MPEG 2, MPEG 4, H.261, H.262, H.263, WMV), proprietary technologies (or non-standard programs), and the like. As used herein, the term "transformation" or "transform" used with respect to image data refers to an act relating to encoding, decoding, decompressing, transcoding, reproducing, image processing including color interpolation, scaling, defect correction, or the like. Generally, the image data are "transformed" to facilitate displaying of encoded image data, for example, on a display area of a host device.

In addition, the digital camera 100 includes a communication interface 118 that is configured to link the digital camera with a remote information processing unit (e.g., a server, storage network, a personal computer, etc.) via the Internet, a local area network (LAN), a wide area network (WAN), or the like. A display interface 120 enables the captured image data to be displayed on a built-in display screen (not shown) of the digital camera that is generally of small screen size. A control bus 122 couples together a plurality of the above components in the digital camera for transmitting control signals. A data bus 124 couples together a plurality of the above components in the digital camera for transmitting data. The control signals and data bus may be transmitted over the same bus or different buses according to specific application.

Figure 2:
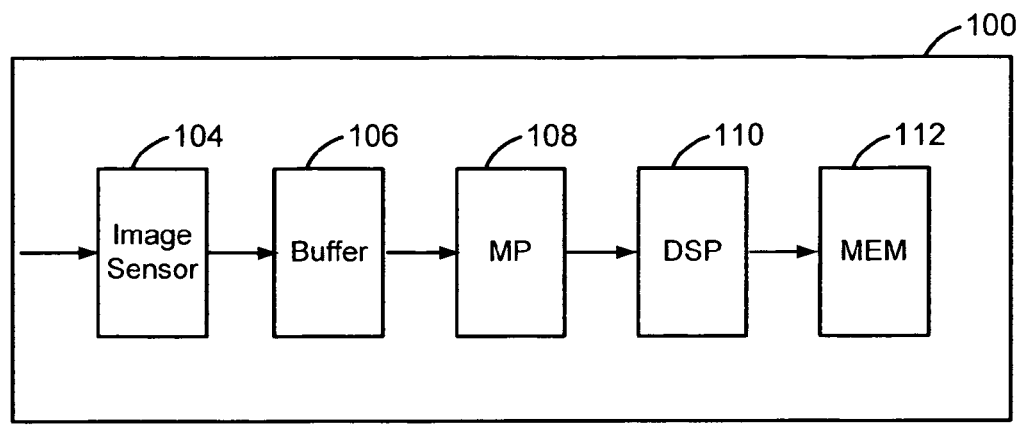
FIG. 2 depicts a block diagram of components of a digital camera involved in capturing and storing images according to one embodiment of the invention.

FIG. 2 depicts some of the components in the digital camera 100 that are involved in capturing and storing image data according to one embodiment of the present invention. The image sensor 104 receives reflected light of an object and converts it into electronic information representing a plurality of pixels. That is, the sensor 104 outputs image signals for an image, consisting of a plurality of horizontal lines, where each line has a plurality of pixels. The image sensor includes a mosaic color filter comprising various colors to obtain color information of the reflected light, e.g., white (W) segments, green (G) segments, cyan (Cy) segments, and yellow (Ye) segments.

The buffer 106 receives the image signal output by the sensor 104 to temporarily store it to assist the microprocessor 108 in processing the image signal. In another embodiment, the microprocessor 108 receives the image signal directly from the sensor 104 without assistance from the buffer.

The microprocessor or processing system 108 performs analog signal processing, analog-to-digital (A/D) conversion, and color digitization and processing according to the present embodiment. In the present embodiment, a single microprocessor performs all of these functions. In another embodiment, three separate dedicated components perform the above three functions, e.g., an analog signal processor, an analog-to-digital converter, and a microprocessor or digital signal processor.

The analog signal processing includes sampling, holding, and gamma correction of the image signal output by the image sensor 104, thereby outputting an image signal of a predetermined format. The A/D conversion involves converting analog image signals resulting from the analog signal processing into digital data or image data. As used herein, the term "image data" refers to analog image information that has been converted to digital information. The color digitization and processing involves generating red color data R, blue color data B, and luminance data Y from the image data resulting from the A/D conversion process. The luminance data represent a mixture of respective color data at a predetermined ratio, e.g., a ratio of 1:2:1 for red, green and blue colors, for each pixel element. The color digitization process also includes obtaining chrominance or color difference data.

The DSP or encoder 110 encodes or compresses the processed image data output by the microprocessor according to a default format of the digital camera 100. The encoding reduces the large image data to a more manageable size. MPEG standard is commonly used encoding technology for digital cameras primarily configured to take moving picture, i.e., DVCs. On the other hand, JPEG standard is commonly used encoding technology for digital cameras primarily configured to take still pictures, i.e., DSCs.

After the image data have been encoded and reduced to a more manageable size, they are stored in the memory 112 for subsequent use. The memory 112 may be of magnetic tapes, optical disk, or transistor type (Flash memory or DRAM). In another embodiment, a single microprocessor is used to perform the functions of both the processing system 108 and the DSP 110.

Figure 3:
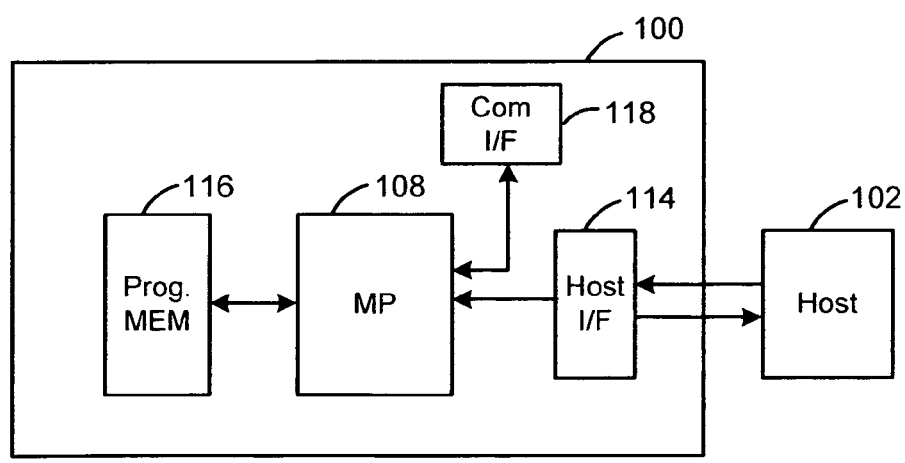
FIG. 3 depicts a block diagram of components of a digital camera involved in performing an identification handshake with a host device according to one embodiment of the invention.

FIG. 3 depicts some of the digital camera components involved in initiating transmission of image data from the digital camera 100 to the host device 102, including performing an identification handshake with the host device, according to one embodiment of the present invention. When the digital camera and the host device are first linked together, they perform an identification handshake. The handshake is used to determine whether the two devices are compatible and/or in what format the digital camera 100 should transmit the image data to the host device 102. In one embodiment, the host device transmits identification information, such as, processor type including clock speed, operating system, display type, and transformation programs (e.g., encoding and decoding technologies) supported, and the like. The host interface forwards the host identification information to the microprocessor 108.

Based on this identification information, the microprocessor determines whether the host device supports the default transformation technology of the digital camera. (The microprocessor also determines whether it or host device is better suited to transform the image data, as explained later.) If it is determined that the host device does not support the default transformation technology, the microprocessor 108 searches the program memory 116 for a transformation program that is supported by the host device. Once located, the transformation program is used to reprogram the microprocessor accordingly, so that the image data can be transformed into a format that is supported by the host device prior to transmitting the image data to the host device. If an appropriate transformation program is not located in the program memory 116, the microprocessor 108 requests the host device to transmit a suitable transformation program. The transmitted program is then used to reprogram the microprocessor 108. However, if the host device also does not have or cannot transmit an appropriate transformation program, then the microprocessor searches remote information processing units via the communication interface 118 for a suitable program.

Figure 4:
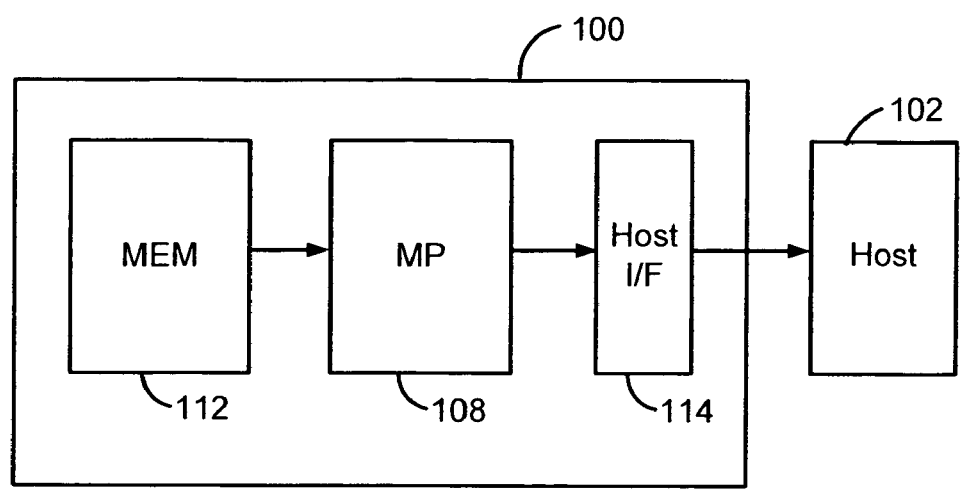
FIG. 4 depicts a bock diagram of components of a digital camera involved in transmitting image data to a host device according to one embodiment of the invention.

FIG. 4 depicts some of the digital camera components that are involved in transmitting image data to the host device 102 according to one embodiment of the present invention. The microprocessor 108 retrieves the encoded image data from the memory 112. The encoded image data is reproduced or transformed according to the transformation program that has been determined to be supported by the host device during the identification handshake. The transformation may involve transcoding from one technology, e.g., MPEG, to another technology, e.g. H.263. Alternatively, the transformation may involve decoding the encoded image data and then encoding them to a technology supported by the host device. The transformation also may involve a combination of transcoding, decoding, and encoding.

In one embodiment, the encoded data is transmitted without further transformation if the microprocessor determines that the host device has superior reproduction or transformation capability than the digital camera, thereby shifting the work to more efficient device. If the host device is determined not to have an appropriate transformation program, the digital camera 100 may also transmit the transformation program to the host device along with the encoded image data. Such a transformation program may be obtained from the program memory 116 in the digital camera 100 or obtained from a remote location via the communication interface 118. In one embodiment, the transformation is shifted to the host device only if it is significantly more efficient or powerful than the digital camera.

Figure 5A:
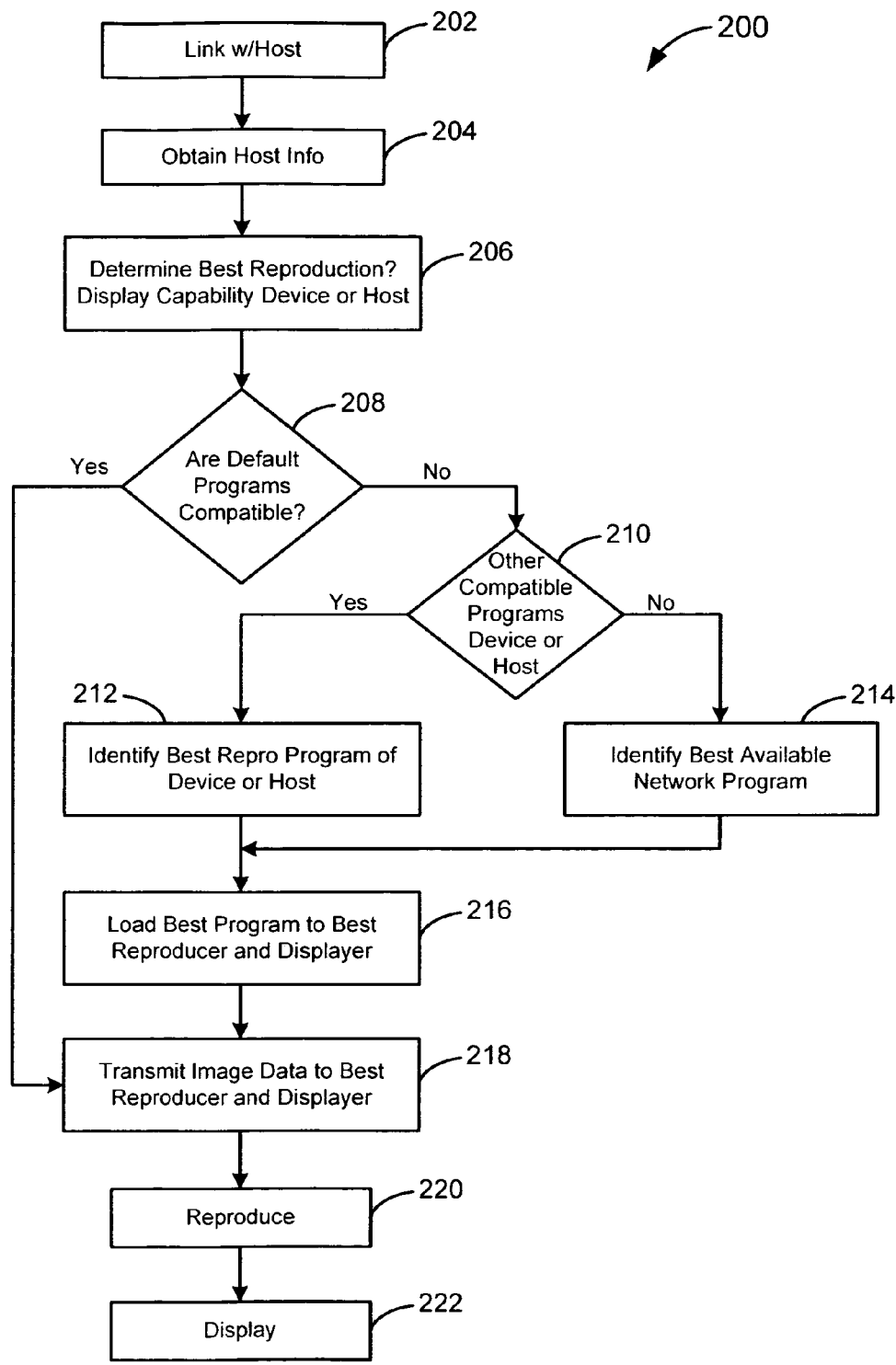
FIG. 5A depicts a simplified flow chart of a method of image data processing according to one embodiment of the invention.

FIG. 5A depicts a process 200 for transmitting image data from the digital camera 100 to the host device 102 according to one embodiment of the present invention. The digital camera 100 is linked to the host device 102 using the host interface 114 (step 202). The link may be a physical link or wireless link. The host device may be various different electronic devices, such as a computer, PDA, cell phone, scanner, as explained previously. The digital camera and the host device perform an identification handshake (step 204). The host device transmits information relating to transformation of image data, e.g., processor type, display type and size, operating system, transformation program or technology supported, and the like. The microprocessor uses the information transmitted by the host device to determine whether the host or camera (also referred as the "device") is best or better suited for reproduction and/or display of the image data. (step 206). This determination may be based on various criteria, e.g., the speed of respective processors and the size of the respective displays. In one embodiment, the determination criteria may be set or modified by a user according to his or her preferences.

Thereafter, the microprocessor also uses the information transmitted by the host device to determine whether the default programs of the digital camera (encoding program) and the host (decoding program) are compatible with each other (step 208).

If not compatible, the microprocessor determines whether the digital camera and/or the host device have programs that are compatible (step 210). If one or more compatible programs have been located, the microprocessor identifies the best one from the available, compatible reproduction programs in the camera or host (step 212) If a compatible program is not found in the camera or host, the microprocessor searches for compatible reproduction programs in a remote server or location via a network, such as the Internet (step 214).

Once a suitable compatible program has been located, the program is loaded onto the "best reproduction device," i.e., the camera or host that has been determined to be best suited for the reproduction and display of the image data at step 206 (step 216). The image data are transmitted to the best reproduction device (step 218). The image data is reproduced in the best reproduction device using the reproduction program provided therein (step 220). Thereafter, the reproduced data is displayed on the display area of the best reproduction device (step 222).

Referring back to step 208, the process proceeds to step 218 if the microprocessor determines that the default programs of the camera and host are compatible to with each other. Thereafter, the step 218 to step 222 are performed in a similar manner as explained above.

Figure 5B:
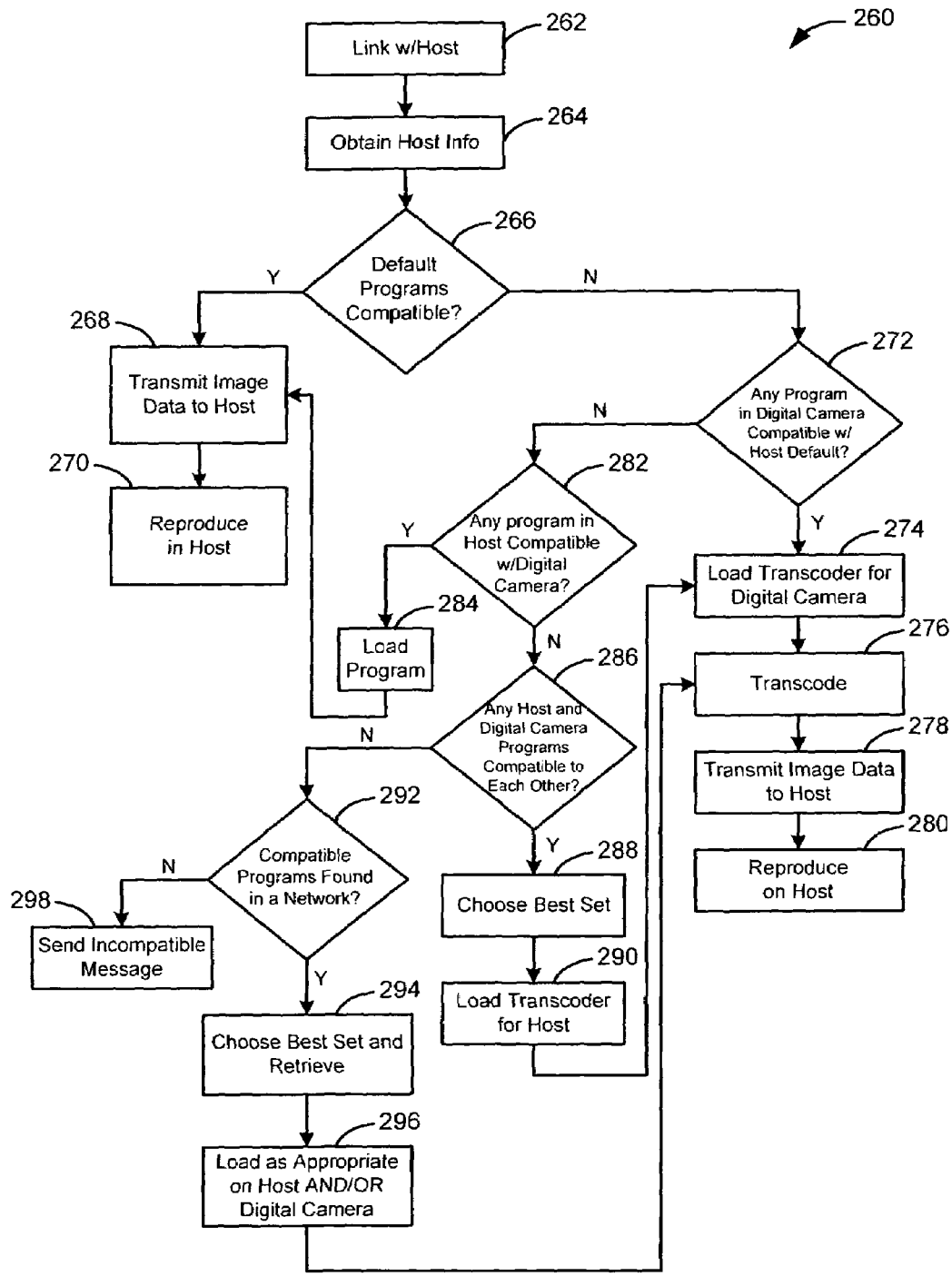
FIG. 5B depicts a simplified flow chart of a method of image data processing according to another embodiment of the invention.

FIG. 5B depicts a process 260 for transmitting image data from the digital camera 100 to the host device 102 according to another embodiment of the present invention. The digital camera 100 is linked to the host device 102 using the host interface 114 (step 262). The link may be a physical link or wireless link. The host device may be various different electronic devices, such as a computer, PDA, cell phone, scanner, as explained before. The digital camera and the host device perform an identification handshake (step 264). The host device transmits information relating to transformation of image data, e.g., a processor type, display type, operating system, transformation program or technology supported, and the like. The microprocessor uses the information transmitted by the host device and determines whether the digital camera's default encoding technology is supported by the host device's default decoding technology (step 266). If supported, the digital camera transmits the encoded image data to the host device (step 268). The encoded image data is then reproduced or decoded in the host device (step 270).

If the digital camera's default encoding technology is not supported by the host device's default program, the microprocessor determines whether the digital camera has any program that is compatible with the default program of the host (step 272). If so, the microprocessor loads the transcoder (step 274) and transcodes the encoded image data (step 276). The transcoded image data is transmitted to the host device (step 278) and reproduced in the host device using the default program of the host (step 280).

If the digital camera does not have a program that is compatible with the default program of the host device, it is determined whether the host device has an alternate program that is compatible with the default encoding program of the digital camera (step 282). If so, the alternate program is loaded in the host device (step 284). The digital camera transmits the image data to the host device (step 268), and the image data are reproduced in the host device thereafter (step 270).

At step 282, if the host device does not have a program that is compatible with the default program of the digital camera, it is determined whether there is any encode program in the digital camera that is compatible with any decode program in the host device (step 286). If so determined, a set of compatible programs in the digital camera and the host device are selected (step 288). If there are more than one set of compatible programs, the best set is selected from them. Thereafter, the transcode programs are loaded in the host device and the digital camera (steps 290 and 274). The image data are transcoded by the digital camera using the newly loaded program and then transmitted to the host device (steps 276 and 278). The host device than reproduces the image data (step 280).

At step 286, if compatible programs cannot be found in the digital camera and the host device, the host is requested to search a remote computer system or database via a network connection to search for compatible programs (step 292). An appropriate set of programs is selected from a plurality of possible program sets that have been located by the search (step 294). The selected programs are loaded on the digital camera and the host device (steps 296). The image data are transcoded and transmitted to the host device by the digital camera (steps 276 and 278). Thereafter, the image data are reproduced in the host device. If a set of compatible programs is not found at the step 292, a message stating that there is an incompatibility problem between the host device and digital camera is displayed (step 298).

Figure 6:
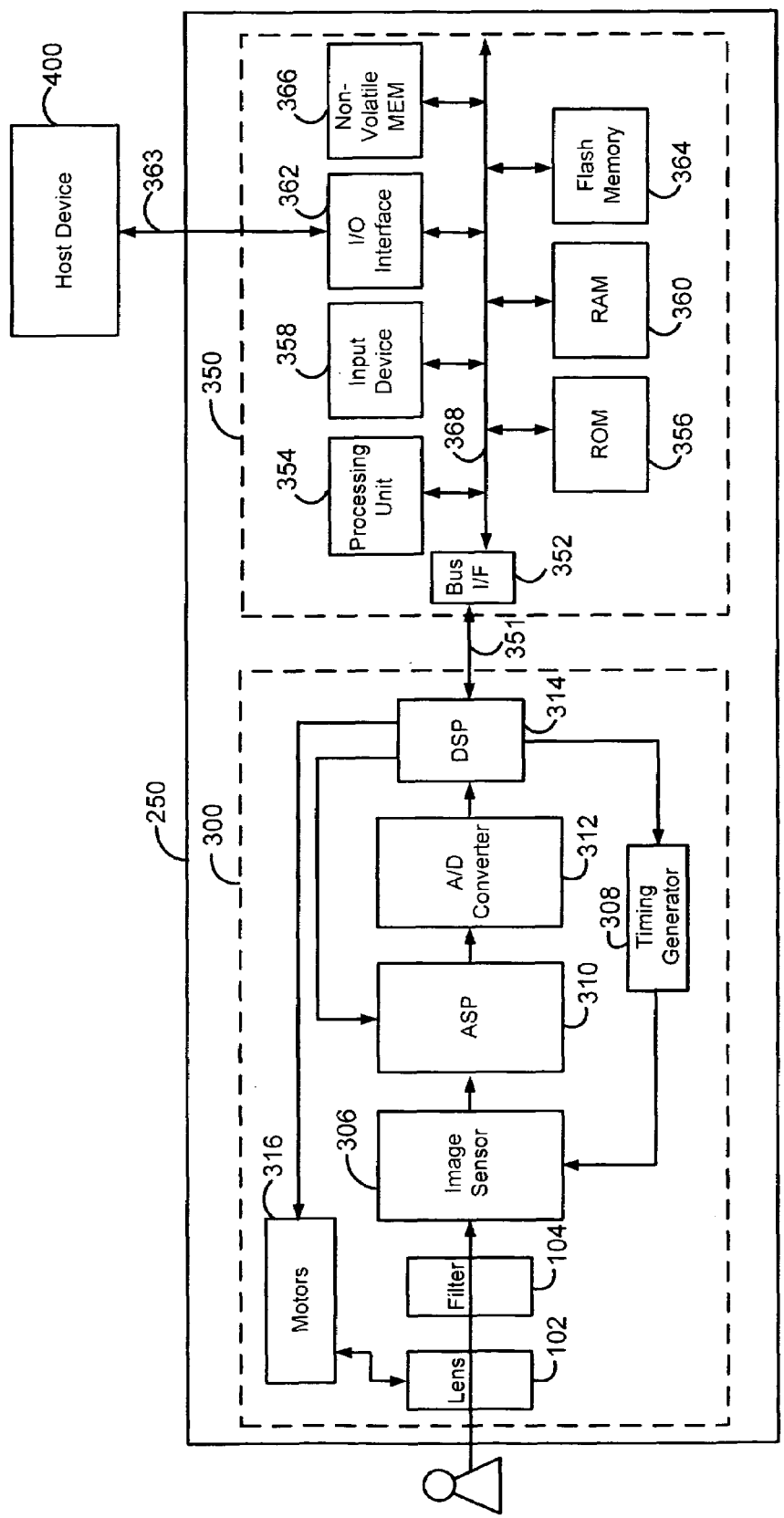
FIG. 6 depicts a digital still camera 250 configured to support a plurality of transformation technologies according to one embodiment of the present invention.

FIG. 6 depicts a digital still camera 250 configured to support a plurality of transformation technologies according to one embodiment of the present invention. The digital still camera 250 includes an imaging device 300 and a processing system 350. The imaging device includes a lens 302 having an iris, a filter 304, an image sensor 306, a timing generator 308, an analog signal processor (ASP) 310, an analog-to-digital (A/D) converter 312, a digital signal processor (DSP) 314, and one or more motors 316.

In operation, imaging device 300 captures an image of object 301 via reflected light impacting the image sensor 306 along an optical path 318. The image sensor 306 generates image signals representing the captured image. The image signals are then routed through the ASP 310, A/D converter 312 and DSP 314. The DSP 314 has outputs coupled to the timing generator 308, ASP 310, and motors 316 to control these components. The DSP 314 also has its output coupled to the processing system 350 via a bus 351. The image signals that have been converted to digital image data are transmitted to system 350 and processed therein.

In one embodiment, the processing system 350 includes a bus interface 352, a processor 354, a read-only memory (ROM) 356, an input device 358, a random access memory (RAM) 360, an I/O interface 362, a flash memory 364, a non-volatile memory 366, and an internal bus 368.

The bus interface 352 is a bi-directional first-in, first-out interface for receiving the raw image data and control signals passed between the system 350 and the DSP 314. The processor 354 executes programming instructions stored in the ROM 356 and RAM 360 to perform various operations. In one embodiment, the processor 354 encodes the image data to reduce them to a more manageable size, i.e., performs the functions of the DSP 110 of the digital camera 100 (FIG. 1). The ROM 356 generally stores a set of computer readable program instructions which control how the processor 354 accesses, transforms and outputs the image data. In one implementation, the ROM 356 also stores a start-up program or file that enables a user to access the images stored in the flash memory using any computer whether it has a companion driver software installed or not.

The input device 358 generally includes one or more control buttons (not shown), which are used to input operating signals that are translated by the processor 354 into an image capture request, an operating mode selection request, and various control signals for the imaging device 300. The I/O Interface 362 is coupled to the internal bus 368 and has an external port connector (not shown) that can be used to couple digital camera 50 to a host device 400 for viewing and editing the image data stored in flash memory 364. As explained previously in connection with the digital camera 100, the image data stored in the memory 364 may be reproduced in the digital still camera 250 or at the host device 400. If reproduced in the digital still camera 250, the processor 354 reproduces the image data. The image data transmission and transformation of this embodiment involves a substantially similar process as that explained in connection with the process 200 (see, FIG. 5A).

As will be understood by those skilled in the art, the present invention may be embodied in other specific forms without departing from the essential characteristics thereof. Accordingly, the foregoing description is intended to be illustrative, but not limiting, of the scope of the invention which is set forth in the following claims.

What is claimed is:

1. A method for processing image data using a digital camera, the method comprising:
providing a digital camera having a first transformation program as a default program, the first transformation program supporting a first transformation technology;
forming a first communication link between the digital camera and a first remote image processing device;
obtaining transformation-related information from the first remote device, the transformation-related information including information about one or more transformation technologies supported by the first remote device;
determining whether the first transformation program is supported by the first remote device; and
searching for a second transformation program supported by the first remote device if the first transformation program is determined not to be supported by the first remote device, the second transformation program supporting a second transformation technology;
wherein the first and second transformation programs are encoding or compression programs, the plurality of transformation programs including at least one decoding or decompression program.

2. The method of claim 1, further comprising:
providing a plurality of transformation programs in a non-volatile memory in the digital camera, the plurality of transformation programs including the first and second transformation programs.

3. The method of claim 1, wherein the digital camera is a digital still camera or a digital video camera.

4. The method of claim 1, wherein the digital camera is a portable electronic device configured to take pictures in a digital format.

5. The method of claim 4, wherein the portable electronic device is a mobile phone or personal digital assistant including a lens, an image sensor, and a processor.

6. The method of claim 1, further comprising:
executing the second transformation program that is supported by the first remote device and stored in a non-volatile memory within the digital camera.

7. The method of claim 1, wherein the searching step includes accessing a non-volatile memory provided in the digital camera, the method further comprising:
loading the second transformation program stored in a non-volatile memory of the digital camera to a volatile memory of the digital camera;
transforming the image data using the second transformation program; and
transmitting the transformed image data to the first remote device.

8. The method of claim 1, further comprising:
providing a plurality of transformation programs in a non-volatile memory of the digital camera, the plurality of transformation programs including the first and second transformation programs;
determining whether the first remote device includes any transformation program that is compatible with the first transformation program of the digital camera; and
initiating, at the first remote device, execution of a transformation program that has been determined to be compatible with the first transformation program of the digital camera.

9. The method of claim 1, further comprising:
providing a plurality of transformation programs in a non-volatile memory of the digital camera, the plurality of transformation programs including the first and second transformation programs;
accessing a second remote device via a second communication link to search for a third transformation program that can facilitate reproduction of the image data at the first remote device; and
downloading the third transformation program to the digital camera or the first remote device.

10. A method for processing image data using a digital camera, the digital camera having a first compression program as a default compression program, the method comprising:
forming a first communication link between the digital camera and a first remote image processing device;
obtaining transformation-related information from the first remote device, the transformation-related information including information about one or more transformation technologies supported by the first remote device;
determining whether the default compression program is supported by the first remote device; and
searching in a non-volatile memory of the digital camera for another compression program if the default compression program is determined not to be supported by the first remote device;
wherein the digital camera includes image data that have been compressed using the default compression program, the method further comprising:
transcoding the image data using the another compression program; and
transmitting the transcoded image data to the first remote device via the first communication link.

11. The method of claim 10, further comprising:
forming a second communication link between the digital camera and a second remote device;
searching the second remote device for a compression program that is supported by the first remote device;
locating the compression program that is supported by the first remote device at the second remote device; and
downloading the located compression program to the digital camera from the second remote device.

12. The method of claim 10, further comprising:
forming a second communication link between the digital camera and a second remote device;
searching the second remote device for a decompression program that is supported by the digital camera;
locating the decompression program that is supported by the digital camera at the second remote device; and
downloading the located decompression program to the first remote device from the second remote device.

13. The method of claim 12, wherein the digital camera is a digital still camera or a camcorder, and the second communication link is a link formed using the Internet, and the second remote device is a server, storage system, or storage subsystem.

14. A method for processing image data using a digital camera, the method comprising:
forming a communication link between the digital camera and a remote image processing device;
obtaining transformation-related information from the remote device, the transformation-related information including information about one or more compression technologies supported by the remote device; and
searching in a non-volatile memory of the digital camera for a compression program that is supported by the remote device, the non-volatile memory storing a plurality of compression programs;
locating a compression program stored in the non-volatile memory that is compatible with a decompression program available to the remote device; and
loading the located compression program from the non-volatile memory of the digital camera to a volatile memory of the digital camera.

15. The method of claim 14, further comprising:
retrieving image data from a storage location accessible to the digital camera;
transforming the image data using to the located compression program; and
transmitting the transformed image data to the remote device from the digital camera.

16. The method of claim 14, further comprising:
retrieving compressed image data from a storage location accessible to the digital camera; and
transmitting the retrieved image data and a decompression program suitable for decompressing the retrieved image data to the remote device, so that the retrieved image data may be decompressed at the remote device.

17. A method for processing image data using a digital camera, the method comprising:
forming a communication link between the digital camera and a remote image processing device;

obtaining transformation-related information from the remote device, the transformation-related information including information about one or more compression technologies supported by the remote device;

searching in a non-volatile memory of the digital camera for a compression program that is supported by the remote device, the non-volatile memory storing a plurality of compression programs;

locating a compression program stored in the non-volatile memory that is compatible with a decompression program available to the remote device;

loading the located compression program from the non-volatile memory of the digital camera to a volatile memory of the digital camera;

retrieving compressed image data from a storage location accessible to the digital camera;

transmitting the retrieved image data and a decompression program suitable for decompressing the retrieved image data to the remote device, so that the retrieved image data may be decompressed at the remote device; and determining whether the digital camera or the remote device is better suited for decompressing image data.

18. An image processing device, comprising:

a lens;

an image sensor to receive light from the lens;

a first storage area to store image data derived from the light received by the image sensor;

a second storage area to store a plurality of encoding or compression programs suitable for encoding or compressing image data;

a communication interface configured to provide an interface with a remote image processing device;

a programmable processor configured to
form a communication link using said communication interface with a remote image processing device,
obtain information from said remote image processing device about an encoding or compression program supported by said remote image processing device.
determine whether a default one of said encoding or compression programs in said second storage area matches a program supported by said remote image processing device,
select said default program if it is supported by said remote image processing device, otherwise searching for another program in said second storage area supported by said remote image processing device a housing enclosing at least the image sensor, first storage area, second storage area, and the processor.

* * * * *

UNITED STATES PATENT AND TRADEMARK OFFICE
CERTIFICATE OF CORRECTION

PATENT NO. : 7,193,649 B2 Page 1 of 1
APPLICATION NO. : 10/405575
DATED : March 20, 2007
INVENTOR(S) : Bryed Billerbeck It is certified that error appears in the above-identified patent and that said Letters Patent is hereby corrected as shown below:

Column 10, line 52, delete the word "to" so that lines 52 and 53 read:

--transforming the image data using the located compression program; and--

Signed and Sealed this

Fifteenth Day of May, 2007

JON W. DUDAS
*Director of the United States Patent and Trademark Office*